United States Patent
Mitchell et al.

(10) Patent No.: US 6,463,645 B1
(45) Date of Patent: Oct. 15, 2002

(54) METHOD AND APPARATUS FOR MOUNTING BEDRAIL HOOKS

(75) Inventors: Herbert L. Mitchell, Asheboro; James A. Morton, Greensboro; Joseph Nalevanko, Kernersville, all of NC (US)

(73) Assignee: B and H Panel Company, Asheboro, NC (US)

( * ) Notice: Subject to any disclaimer, the term of this patent is extended or adjusted under 35 U.S.C. 154(b) by 64 days.

(21) Appl. No.: 09/637,414

(22) Filed: Aug. 11, 2000

(51) Int. Cl.[7] .................. B23Q 17/00; B23P 21/00; A47C 19/00; B27B 31/00
(52) U.S. Cl. .................. 29/407.01; 29/709; 29/712; 29/771; 29/787; 5/296; 144/245.6
(58) Field of Search ............... 29/407.01, 701, 29/709, 718, 494, 721, 771, 787, 790, DIG. 101, 468, 712; 5/296, 288; 144/245.6, 245.1, 245.5, 245.7, 4.7, 382, 385, 418, 326

(56) References Cited

U.S. PATENT DOCUMENTS

| | | | |
|---|---|---|---|
| 3,602,237 A | 8/1971 | Jureit | 100/53 |
| 3,603,244 A | 9/1971 | Jureit | 100/48 |
| 3,748,668 A | * 7/1973 | Rudin | 5/296 |
| 3,793,655 A | * 2/1974 | Harris et al. | 5/296 |
| 3,958,284 A | 5/1976 | Jureit | 5/200 |
| 4,299,509 A | * 11/1981 | Meickl | 403/252 |

\* cited by examiner

Primary Examiner—I. Cuda-Rosenbaum
Assistant Examiner—John C. Hong
(74) Attorney, Agent, or Firm—MacCord Mason PLLC (57) ABSTRACT

An apparatus for mounting a hookplate to a bedrail, including a device that transports bedrails into a hookplate receiving position, a hopper that stores hookplates, a first hookplate pusher sliding under the hopper and pushing a fallen hookplate, a second hookplate pusher clamping onto the hookplate and pushing the hookplate into a hookplate mounting position, a pin supply chamber, pin drivers to determine whether the apertures in the bedrail and hookplate are properly aligned, a holding plate temporarily holding pins, the pin drivers then driving their respective pins into the apertures in the bedrail and hookplate to securely fasten the assembly.

72 Claims, 5 Drawing Sheets

METHOD AND APPARATUS FOR MOUNTING BEDRAIL HOOKS

BACKGROUND OF THE INVENTION

The present invention relates generally to bedrail and hookplate assembly and, more particularly, to an apparatus that automatically mounts hookplates to bedrails in an efficient and accurate manner.

Typically, in wooden bed frames, a flat, metal plate having hooks for engaging a post associated with a headboard or footboard, is mounted in a slot or on the side of both ends of a wooden bedrail. The hookplate usually includes multiple apertures through which multiple pins or other fasteners extend in order to securely attach the hookplate to the bedrail. These types of hookplates are standard in the wooden bedrail manufacturing industry.

Conventional bedrail manufacturing plants use manual labor to mount the hookplates to the ends of the bedrails. One of the reasons that manual labor is used is that when mounting the hookplates to the bedrails with the pins, it is important that the apertures in the bedrail are aligned with the apertures in the hookplate. If the apertures are not appropriately aligned, the powerful forces used in inserting the pins cause significant damage to the bedrail and/or the hookplate. For example, the wood surfaces surrounding the apertures become damaged and the hookplate bends out of shape. A human being is able to accurately align the apertures in the bedrail and the hookplate to avoid such damage.

As with any type of manufacturing, economics is of primary importance. The use of manual labor to mount the hookplates to the bedrails is generally associated with costly labor expenses and less than desired manufacturing efficiency.

Thus, there remains a need for an efficient and accurate apparatus that automatically mounts hookplates to bedrails.

SUMMARY OF THE INVENTION

The present invention fulfills this need in the art by providing an apparatus that automatically mounts a hookplate to a bedrail including a bedrail transport mechanism that transports a bedrail to a hookplate receiving position, a hookplate feeder that places a hookplate in a hookplate mounting position, and a pin driving mechanism that drives at least one pin through the bedrail and the hookplate to mount the hookplate to the bedrail. The bedrail transport mechanism typically includes pusher dogs that transport the bedrail to the hook receiving position.

In a preferred embodiment the hookplate feeder includes a hookplate hopper that stores a plurality of hookplates. The hopper is preferably positioned above a planar surface such that a single hookplate at a time falls onto the planar surface and rests between a bottom of the hopper and a top of the planar surface. A first hookplate pusher slides between the bottom of the hookplate hopper and the top of the planar surface to push the hookplate that falls from the hookplate hopper to a first position. A second hookplate pusher pushes the hookplate from the first position to the hookplate mounting position. The second hookplate pusher includes a clamp having a first end and a second end, the first end being configured to clamp down onto the hookplate. The clamp includes a fulcrum such that when the second end of the clamp is directed towards the planar surface, the first end of the clamp is directed away from the planar surface. When the clamp is waiting for the hookplate from the first hookplate pusher, the second end of the clamp is held under a clamp base in a position directed toward the planar surface such that first end of the clamp is directed away from the planar surface and is open to receive the hookplate. When the first hookplate pusher pushes the hookplate into the first position, the clamp moves away from the clamp base and a spring supports the second end of the clamp in a position directed away from the planar surface so that the first end of the clamp clamps down on the hookplate. The clamp base includes a roller that holds the second end of the clamp in the position directed toward the planar surface and permits the second end of the clamp to slide away from the clamp base.

The pin driving mechanism preferably includes at least one pin driver that drives the pin through the bedrail and the hookplate. In a first step, the pin driver fully extends into an aperture in the bedrail and an aperture in the hookplate to align the apertures. The pin driver then retracts. A pin supply chamber is provided that stores a plurality of pins. At least one pin is transported from the pin supply chamber to the pin driving mechanism after the pin driver retracts. A pin holding plate is provided that has at least one generally cylindrical opening that temporarily holds the pin after it is transported from the pin supply chamber to the pin driving mechanism. The generally cylindrical opening in the pin holding plate includes a set of spring loaded detents that prevent the pin from passing through the holding plate when the pin first enters the holding plate. The pin driver then drives the pin past the detents and substantially completely through the aperture in the bedrail and the aperture in the hookplate to mount the hookplate to the bedrail.

A plurality of pneumatic cylinders may be used to drive the bedrail transport mechanism, the hookplate feeder, and the pin driving mechanism. The position of the pneumatic cylinders may be detected by electronic sensors. A programmable logic controller may be used to control the plurality of pneumatic cylinders.

BRIEF DESCRIPTION OF THE DRAWINGS

The invention will become apparent to those skilled in the art after reading the following description of the preferred embodiments when considered with the drawings.

DESCRIPTION OF THE PREFERRED EMBODIMENTS

In the following description, like reference characters designate like or corresponding parts throughout the several views. Also in the following description, it is to be understood that such terms as "forward," "rearward," "left," "right," "up," "down," and the like are words of convenience and are not to be construed as limiting terms. Referring now to the drawings, it will be understood that the illustrations are for the purpose of describing a preferred embodiment of the invention and are not intended to limit the invention thereto.

Figure 1A:
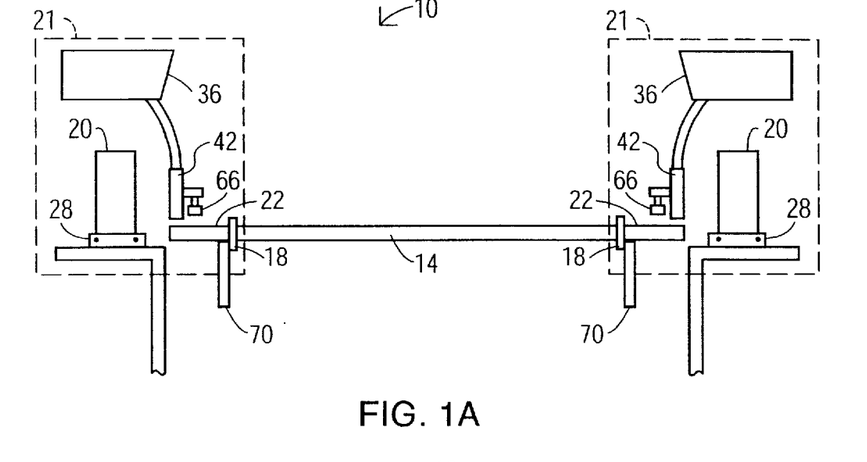
FIG. 1A is a front schematic view of an apparatus for mounting bedrail hooks constructed according to a preferred embodiment of the present invention.
Figure 1B:
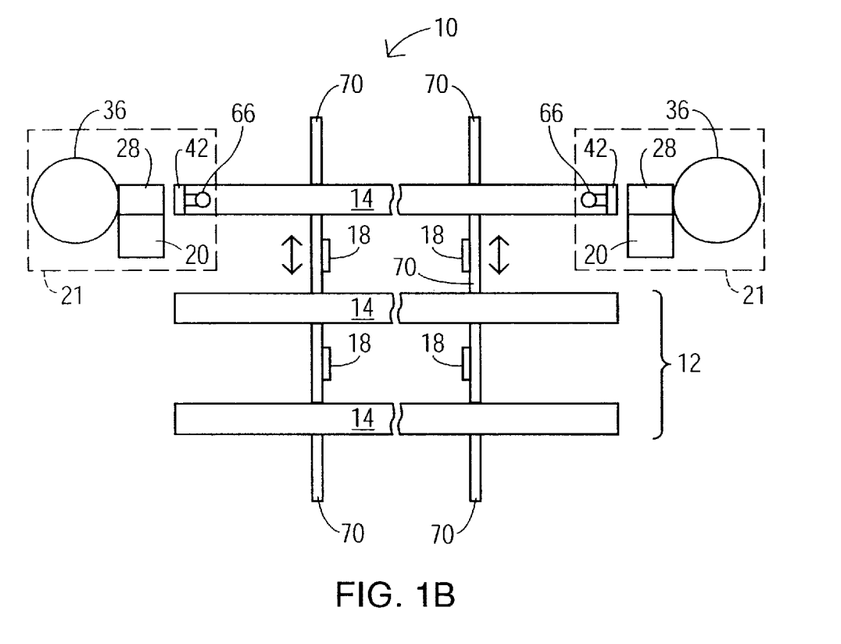
FIG. 1B is a top schematic view of the apparatus of FIG. 1A.
Figure 1C:
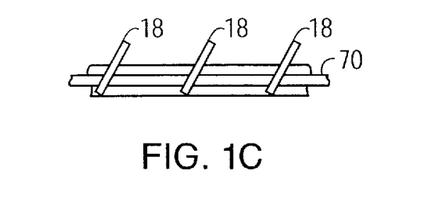
FIG. 1C is an end view of flexed pusher dogs that index the bedrails down an assembly line according to the present invention.
Figure 1D:
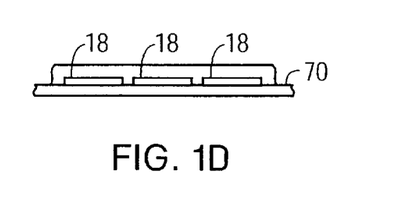
FIG. 1D is an end view of the pusher dogs of FIG. 1C in a relaxed position.

As best seen in FIGS. 1A and 1B, an apparatus for mounting a hookplate to a bedrail, generally designated 10, is shown constructed according to the present invention. The apparatus includes an assembly line 12 that moves a plurality of bedrails 14 into a position to receive a hookplate 16 on either one or both ends of each of the bedrails 14. In a preferred embodiment, pusher dogs 18 pivot on a bar 70 that reciprocates back and forth to move the bedrails 14 down the assembly line 12. As shown in FIG. 1C, the pusher dogs 18 rotate upwardly when the bar 70 moves in the direction of the assembly line 12 to index the bedrails 14. As shown in FIG. 1D, the pusher dogs 18 rotate downwardly when the bar 70 moves backwards to slide under the previously indexed bedrail 14 and prepare to index the next bedrail 14 on the assembly line 12.

Conventional bedrails 14 include a hookplate 16 mounted on both ends of the bedrail 14 so that the bedrail 14 can engage a post in both a headboard and a footboard. Thus, in the embodiment illustrated in FIGS. 1A and 1B, a hookplate mounting section 21 is located on either side of the apparatus 10 to mount a hookplate 16 on both ends of the bedrail 14. While the following description of the mounting machinery refers to only one side of the apparatus 10, it will be understood that the same description applies to the machinery on the opposite side of the apparatus 10, laid out generally as a mirror image.

Figure 6:
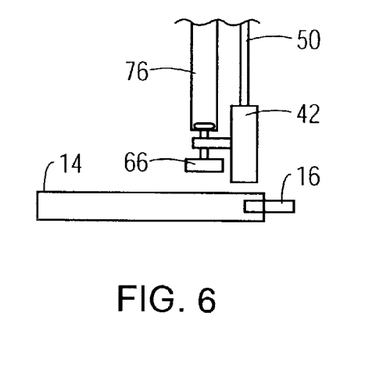
FIG. 6 is a front view of a pin driving section constructed according to an embodiment of the present invention.

Once the bedrail 14 is located in a position to receive a hookplate 16, a pressure foot 66 (shown in detail in FIG. 6) extends down to hold the bedrail 14 in position.

Figures 2A, 2B:
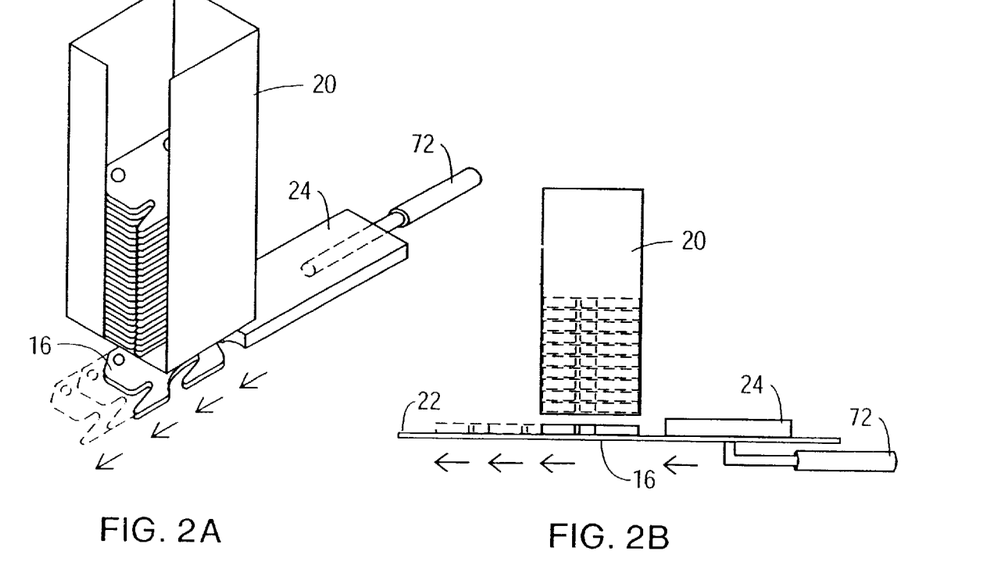
FIG. 2A is a perspective view of a hookplate hopper according to an embodiment of the present invention.
FIG. 2B is an end view of the hookplate hopper of FIG. 2B.

Turning now to FIGS. 2A and 2B, there is shown a hookplate hopper 20 that stores a plurality of hookplates 16 waiting to be mounted onto the bedrails 14 on the assembly line 12. The hopper 20 is preferably located slightly above a hookplate mounting surface 22 such that that the height between then the bottom of the hopper 20 and the mounting surface 22 is substantially equal to the thickness of one hookplate 16. This configuration permits only one hookplate 16 at a time to rest between the hookplate mounting surface and the hopper 20. A thin plate 24, having a height that is also about the same height as the hookplate 16, slides under the hopper 20 and pushes the bottom hookplate 16, resting on the surface 22, to a first position (B of FIG. 4). When the thin plate 24 retracts, the next bottom-most hookplate in the hopper 20 falls out of the hopper 20 by gravity and onto the hookplate mounting surface 22 so that it can mounted into the next bedrail 14 on the assembly line 12.

Figure 3A:
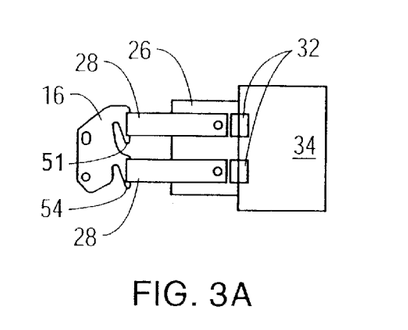
FIG. 3A is a top view of a hookplate pusher constructed according to the present invention.

As shown in FIG. 3A, a second hookplate pusher 26 is configured to clamp onto the hookplate 16 after it is moved to the first position, and push the hookplate 16 to a hookplate mounting position. Preferably, the second hookplate pusher 26 includes two finger-like clamps 28 that are configured to clamp down on the two hooks (51, 54 of FIG. 5B) of a conventional hookplate, such as hookplate 16. It should be understood that the second hookplate pusher 26 may be adapted to clamp down on non-conventional hookplates 16. For example, the second hookplate pusher 26 may include a single finger-like clamp 28 to clamp down on a hookplate 16 having only one hook.

Figure 3B:
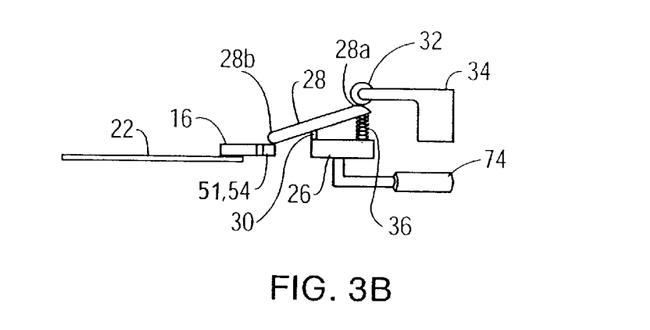
FIGS. 3B and 3C are end views of the hookplate pusher of FIG. 3A.
Figure 3C:
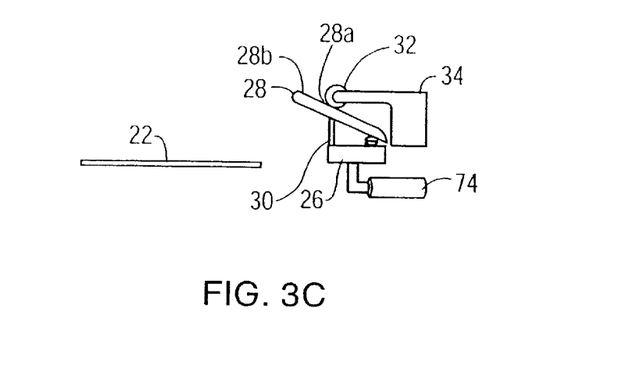

Referring now to FIGS. 3B and 3C, the finger-like clamps 28 are balanced on a fulcrum 30 so that they can rock up and down like a seesaw. When one end of the clamp 28 is pointed toward the hookplate mounting surface 22, the other end is pointed away from the hookplate mounting surface 22. When the second hookplate pusher 26 is idle, (i.e. retracted to the right from the position shown in FIG. 3B) one end (28a) of each of the finger-like clamps 28 is located under a roller 32 on a base 34, as shown in FIG. 3C. The rollers 32 hold these ends (28a) of the fingers 28 down so that the opposite ends (28b) of the fingers 28 are open to receive the hookplate 16 from the thin plate pusher 24. Once the hookplate 16 is located in the first position and is ready to be clamped, the second hookplate pusher 26 moves away from the base 34 and towards the bedrail 14. As soon as the ends (28a) of the fingers 28 slide from under the rollers 32, springs 36 that are located under the ends (28a) of the fingers 28 extend to hold those ends (28a) of the fingers 28 in an upward position. This forces the opposite ends (28b) of the fingers 28 to clamp down on the hooks 51, 54 of the hookplate 16, as shown in FIG. 3B. The second hookplate pusher 26 then continues to push the hookplate 16 towards the hookplate mounting position.

Figure 4:
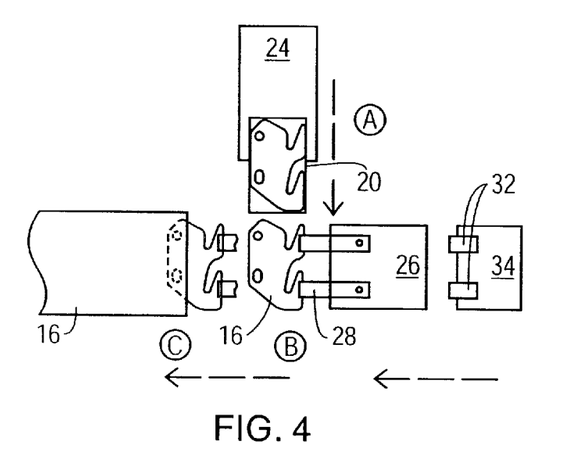
FIG. 4 is a top view of the various positions into which a hookplate is moved to reach a bedrail mounting position according to the present invention.

The various steps just described in which the apparatus 10 moves the hookplate 16 into hookplate mounting position, are illustrated in FIG. 4. In step A, the hookplate 16 drops from the hopper 20 and is moved by the thin plate 24 to the first position. In step B, the fingers 28 slide away from the rollers 32 and clamp onto the hookplate 16. In step C, the second hookplate pusher 26 moves the hookplate 16 from the first position to the hookplate mounting position to form a bedrail and hookplate assembly.

Figure 5A:
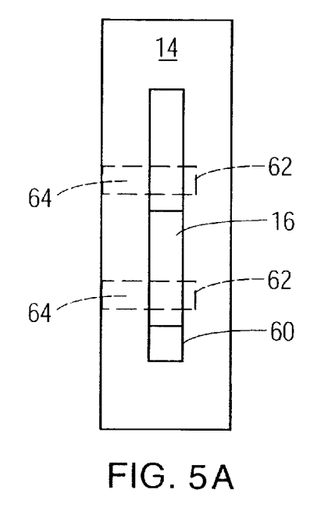
FIG. 5A is an end view of a bedrail and hookplate assembly according to the present invention.
Figure 5B:
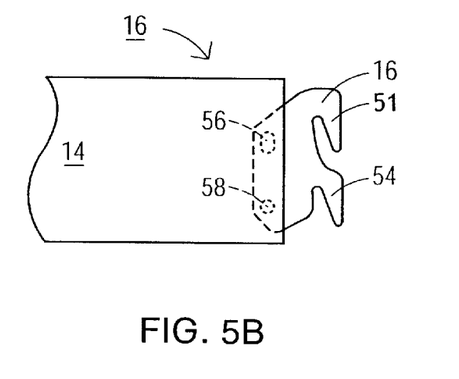
FIG. 5B is a top view of the bedrail and hookplate assembly of FIG. 5A.

FIGS. 5A and 5B illustrate the bedrail 14 and hookplate 16 assembly prior to being fastened by the pins 38. Although the hookplate 16 may be mounted on the side of the bedrail 14, it is preferably mounted in a slot 60 extending into the end of the bedrail 14. As discussed above, conventional hookplates, such as hookplate 16, include a first downwardly extending hook 51 forming a first indentation and a second downwardly extending hook 54 forming a second indentation. A conventional hookplate 16 also includes first and second apertures 56, 58 through which pins extend to fasten the hookplate 16 to the bedrail 14. The apertures 56, 58 are large enough to provide passage of the pin 38 and may be oversized and elongated to provide for a certain amount of play for the hookplate 16. Providing play in the hookplate 16 allows for slight adjustments in hookplate 16 orientation as the bedrail 14 is mounted to the headboard or footboard. The hookplate 16 position will normally adjust and conform to a secure location and orientation. Providing oversized or elongated apertures 56, 58 also allows for greater tolerances associated with the placement of the pins 38, which ultimately engage and hold the hookplate 16.

Prior to the bedrail 14 being placed on the assembly line 12, two apertures or bores 62, 64 are made near the end of the bedrail. Preferably, the apertures 62, 64 do not extend completely through the bedrail 14, but rather extend from the one side past the slot 60 and into the other side of the bedrail 14. A remaining portion 62 remains in order to provide an uninterrupted and unobstructed outer side of the bedrail 14 for aesthetics. Thus, in the preferred embodiment, the pins 38 extend through the apertures 62, 64 of the bedrail 14 and the apertures 56,58 of the hookplate 16 and stop just prior to reaching the remaining portion 62.

Figure 7:
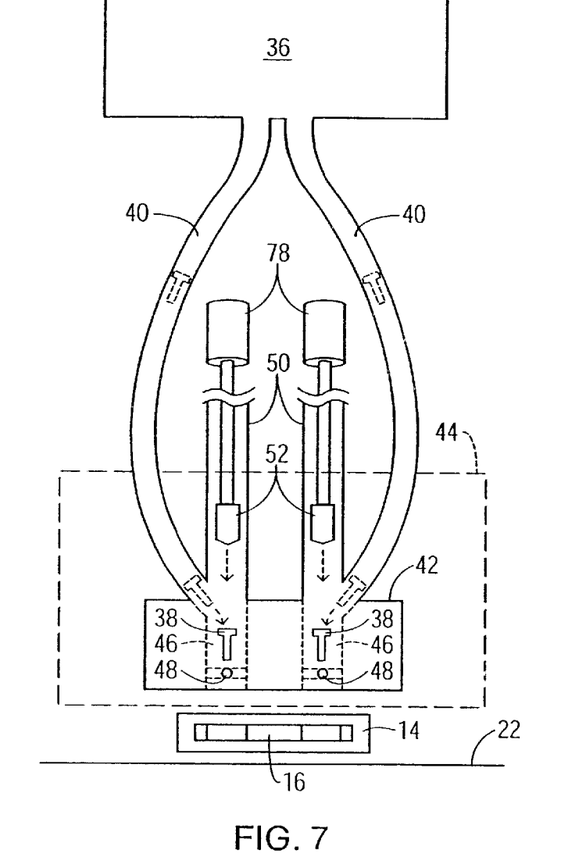
FIG. 7 is an end view of the hookplate mounting section of the embodiment of FIGS. 1A and 1B.

Turning now to FIG. 7, two pipes 50 extend upwardly from either side of a pin driving section 44 and are aligned with cylindrical openings 46 in a holding plate 42. A cylindrical pin driver 52 having a chamfered bottom, is located inside each of the pipes 50 and is used to drive the pins 38 to mount the hookplate 16 to the bedrail 14.

The process of driving the pins 38 into the bedrail 14 and hookplate 16 involves several steps. First, the pressure foot 66 is released and the pin drivers 52 fully extend into the apertures 56,58 in the hookplate 16 and the apertures 62,64 in the bedrail 14 to slightly move any misaligned pieces into alignment. Releasing the pressure foot 66 allows the bedrail 14 to move as needed to ensure alignment of the apertures 56,58,62,64. Such alignment avoids damage to the bedrail 14 and hookplate 16 during the pin insertion process. While the pin drivers are still inside the apertures 56,58,62,64, the pressure foot 66 re-extends to hold the bedrail 14 in place during the pin insertion process.

The pin drivers 52 then retract back into pipes 50, to make room for the pins 38 that are used to fasten the hookplates 16 to the bedrail 14. As shown in FIG. 7, a pin supply chamber 36 that stores a plurality of pins 38 is preferably located above the hookplate mounting surface 22. The pin supply chamber is configured to release two pins 38 at a time, one pin 38 for each aperture in the hookplate 16. It should be understood that when mounting a hookplate 16 having only one aperture, the chamber 36 may be configured to drop only one pin 38.

Figure 8A:
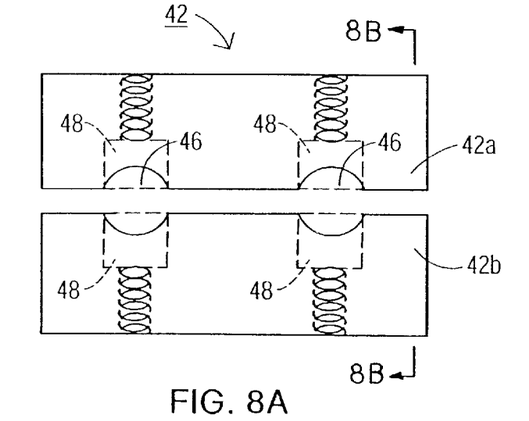
FIG. 8A is a top view of the holding plate of FIG. 7.
Figure 8B:
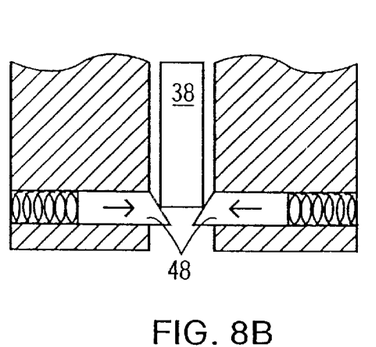
FIG. 8B is a side sectional view taken along line 8B of the holding plate of FIG. 8A.

When pins 38 are dropped from either side of the chamber 36, the pins 38 fall by gravity through a pair of tubes 40 to the pin driving section 44. The pin driving section 44 includes a holding plate 42 that temporarily holds the pins 38 below the pin drivers 52 before they are inserted into the hookplate 16 and the bedrail 14. The holding plate 42, as shown in FIG. 8A, is formed of two metal plates 42a, 42b that fit together to form a plate 42 having two cylindrical openings 46. Each of the cylindrical openings 46 in the holding plate 42 includes a set of spring-loaded detents 48. The detents extend into the openings 46 to frictionally engage the pins 38, as shown in FIG. 8B, thereby preventing the pins 38 from going through the holding plate 42 until they are ready to be driven into the bedrail and hookplate assembly.

Next, the pin drivers 52 drive the pins 38 past the detents 48 and almost completely through the bedrail 14, stopping the pins 38 just prior to reaching the remaining portion 62 of the bedrail 14. At this point, the hookplate 16 is securely fastened to the bedrail 14 and the mounting process is complete. The pressure foot 66 is released, the fingers 28 release the clamp on the hookplate 16, and the pusher dogs 18 move the completed bedrail 14 and hookplate 16 assembly down the assembly line 12.

In each of the embodiments discussed above, the various components of the apparatus 10 are driven by pneumatic cylinders, which are known in the art. Photoelectric and proximity sensors are used to detect the positions of the various cylinders and a programmable logic controller (PLC) is used to control the cylinders based on their detected positions. For example, a photoelectric sensor may be used to determine when a bedrail and hookplate assembly is ready to be fastened so that a PLC may direct the driving cylinders 78 to operate the pin drivers 52 to drive the pins 38.

Figure 9:
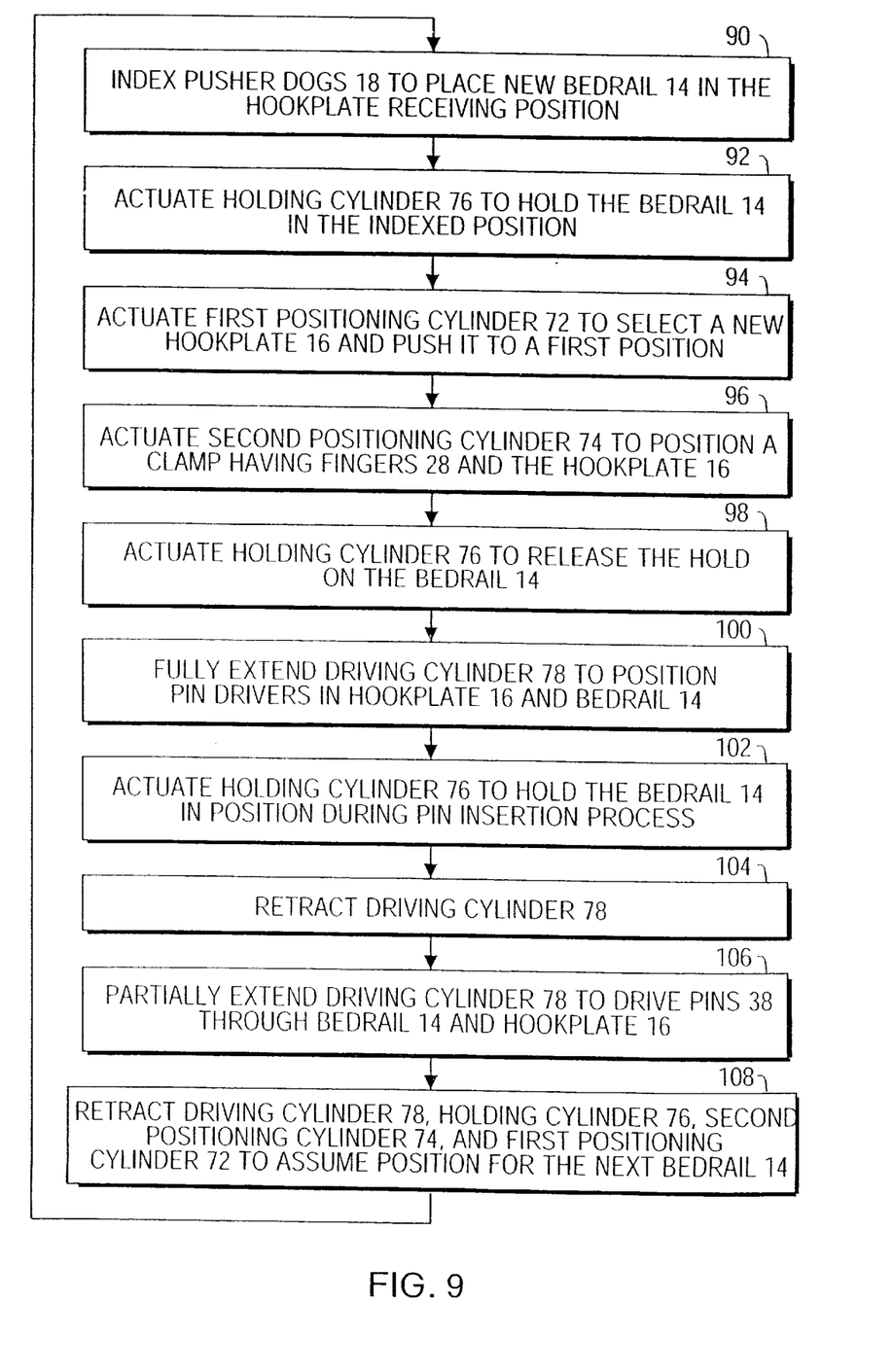
FIG. 9 is a flow chart of an exemplary mode of operation.

A flow chart explaining a simplified operation of the cylinders is shown in FIG. 9. In step 90, the pusher dogs 18 place a new bedrail 14 in the hookplate receiving position. In step 92, a holding cylinder 76 (shown in FIG. 6) moves the pressure foot 66 to hold the bedrail 14 while the hookplate 16 is inserted. In step 94, a first positioning cylinder 72 (shown in FIGS. 2A and 2B) moves the thin plate 24 to push the hookplate 16 to the first position. In step 96, a second positioning cylinder 74 (shown in FIGS. 3A and 3B) moves the second hookplate pusher 26 away from the base 34 so that the fingers 28 clamp down on the hookplate 16. In step 98, the holding cylinder 76 retracts in preparation for the step that aligns the apertures in the hookplate and the bedrail. In step 100, driving cylinders 78 (shown in FIG. 7) fully extend to drive the pin drivers 52 into the bedrail and hookplate assembly to ensure alignment of the apertures. In step 102, the holding cylinder 76 re-extends to hold the bedrail 14 during the pin insertion process. In step 104, the driving cylinders 78 retract the pin drivers 52 to prepare to insert the pins 38. In step 106, the driving cylinders 78 partially drive the pin drivers 52 to insert the pins 38 into the bedrail and hookplate assembly, thereby completing the pin insertion process. Finally, in step 108, the driving cylinders 78, the holding cylinder 76, the second positioning cylinder 74, and the first positioning cylinder 72 retract to prepare to fasten the next bedrail and hookplate assembly.

Certain modifications and improvements will occur to those skilled in the art upon a reading of the foregoing description. By way of example, the apparatus 10 may be adapted to mount a hookplate 16 to only one end of a bedrail 14. Further, the apparatus 10 may be adapted to mount a hookplate 16 having only one hook or one aperture. In addition, the present invention may be driven by sources of power other than pneumatic cylinders. It should be understood that all such modifications and improvements have been deleted herein for the sake of conciseness and readability but are properly within the scope of the following claims.

What is claimed is:

1. An apparatus for mounting a hookplate to a bedrail comprising:
   a bedrail transport mechanism that transports a bedrail to a hookplate receiving position;
   a hookplate feeder that places a hookplate in a hookplate mounting position; and
   a pin driving mechanism that drives at least one pin through the bedrail and the hookplate to mount the hookplate to the bedrail.

2. The apparatus of claim 1 wherein the bedrail transport mechanism comprises pusher dogs that transport the bedrail to the hookplate receiving position.

3. The apparatus of claim 1 further comprising a pressure foot that places pressure on the bedrail when the bedrail is in the hookplate receiving position, to stabilize the bedrail while the hookplate is mounted to the bedrail.

4. The apparatus of claim 3 further comprising a holding cylinder that pneumatically operates the pressure foot.

5. The apparatus of claim 1 wherein the hookplate feeder comprises a hookplate hopper that stores a plurality of hookplates, the hookplate hopper being positioned above a planar surface such that a single hookplate at a time falls onto the planar surface and rests between a bottom of the hookplate hopper and a top of the planar surface.

6. The apparatus of claim 5 wherein the hookplate feeder further comprises a first hookplate pusher that slides between the bottom of the hookplate hopper and the top of the planar surface to push the hookplate that falls from the hookplate hopper to a first position.

7. The apparatus of claim 6 wherein the hookplate feeder further comprises a first hookplate positioning cylinder that pneumatically operates the first hookplate pusher.

8. The apparatus of claim 6 wherein the hookplate feeder further comprises a second hookplate pusher that pushes the hookplate from the first position to the hookplate mounting position.

9. The apparatus of claim 8 wherein the hookplate feeder further comprises a second positioning cylinder that pneumatically operates the second hookplate pusher.

10. The apparatus of claim 8 wherein the second hookplate pusher comprises a clamp having a first end and a second end, the first end being configured to clamp down onto the hookplate.

11. The apparatus of claim 10 wherein the clamp includes a fulcrum such that when the second end of the clamp is directed towards the planar surface, the first end of the clamp is directed away from the planar surface.

12. The apparatus of claim 11 wherein when the clamp is waiting for the hookplate from the first hookplate pusher, the second end of the clamp is held under a clamp base in a position directed toward the planar surface such that first end of the clamp is directed away from the planar surface and is open to receive the hookplate.

13. The apparatus of claim 12 wherein when the first hookplate pusher pushes the hookplate into the first position, the clamp moves away from the clamp base and a spring supports the second end of the clamp in a position directed away from the planar surface so that the first end of the clamp clamps down on the hookplate.

14. The apparatus of claim 12 wherein the clamp base includes a roller that holds the second end of the clamp in the position directed toward the planar surface and permits the second end of the clamp to slide away from the clamp base.

15. The apparatus of claim 1 wherein the pin driving mechanism comprises a least one pin driver that drives the pin through the bedrail and the hookplate.

16. The apparatus of claim 15 wherein the pin driving mechanism further comprises a driving cylinder that pneumatically operates the pin driver.

17. The apparatus of claim 15 wherein the pin driver extends into an aperture in the bedrail and an aperture in the hookplate to align the aperture in the bedrail with the aperture in the hookplate.

18. The apparatus of claim 17 wherein the pin driver retracts after aligning the aperture in the bedrail with the aperture in the hookplate.

19. The apparatus of claim 18 further comprising a pin supply chamber that stores a plurality of pins.

20. The apparatus of claim 19 wherein at least one pin is transported from the pin supply chamber to the pin driving mechanism after the pin driver retracts.

21. The apparatus of claim 20 wherein the pin is transported from the pin supply chamber in a pin tube.

22. The apparatus of claim 20 wherein the pin driving mechanism further comprises a pin holding plate having at least one generally cylindrical opening that temporarily holds the pin after it is transported from the pin supply chamber to the pin driving mechanism.

23. The apparatus of claim 22 wherein the generally cylindrical opening in the pin holding plate includes a set of detents that prevents the pin from passing through the holding plate when the pin first enters the holding plate.

24. The apparatus of claim 23 wherein the detents are spring loaded.

25. The apparatus of claim 24 wherein the pin driver drives the pin past the detents and substantially completely through the aperture in the bedrail and the aperture in the hookplate to mount the hookplate to the bedrail.

26. The apparatus of claim 1 further comprising a plurality of pneumatic cylinders that drive the bedrail transport mechanism, the hookplate feeder, and the pin driving mechanism.

27. The apparatus of claim 26 wherein a position of each of the pneumatic cylinders is detected by at least one electronic sensor.

28. The apparatus of claim 26 further comprising at least one programmable logic controller that controls the plurality of pneumatic cylinders.

29. An apparatus for mounting a hookplate to a bedrail comprising:
    a bedrail transport mechanism that transports a bedrail to a hookplate receiving position, the bedrail having a first end and a second end;
    a first hookplate feeder that places a first hookplate in a first hookplate mounting position;
    a second hookplate feeder that places a second hookplate in a second hookplate mounting position;
    a first pin driving mechanism that drives a first pin through the first end of the bedrail and the first hookplate to mount the first hookplate to the first end of the bedrail; and
    a second pin driving mechanism that drives a second pin through the second end of the bedrail and the second hookplate to mount the second hookplate to the second end of the bedrail.

30. A method of mounting a hookplate to a bedrail comprising the steps of:
    transporting the bedrail to a hookplate receiving position including indexing pusher dogs to transport the bedrail into the hookplate receiving position;
    placing the hookplate in a hookplate mounting position; and
    driving at least one pin through the bedrail and the hookplate to mount the hookplate to the bedrail.

31. The method of claim 30 further comprising the step of stabilizing the bedrail while the hookplate is mounted to the bedrail.

32. A method of mounting a hookplate to a bedrail comprising the steps of:
    transporting the bedrail to a hookplate receiving position;
    placing the hookplate in a hookplate mounting position;
    driving at least one pin through the bedrail and the hookplate to mount the hookplate to the bedrail; and
    stabilizing the bedrail while the hookplate is mounted to the bedrail including pneumatically operating a holding cylinder.

33. The method of claim 30 further comprising the step of transporting the bedrail out of the hookplate receiving position after the driving step.

34. A method of mounting a hookplate to a bedrail comprising the steps of:
    transporting the bedrail to a hookplate receiving position;
    placing the hookplate in a hookplate mounting position including a single hookplate falling onto a planar surface from a hookplate hopper positioned above the planar surface and the single hookplate resting between a bottom of the hookplate hopper and a top of the planar surface; and driving at least one pin through the bedrail and the hookplate to mount the hookplate to the bedrail.

35. The method of claim 34 wherein the placing step further includes sliding a first hookplate pusher between the bottom of the hookplate hopper and the top of the planar surface to push the hookplate to a first position.

36. The method of claim 35 wherein the sliding step includes pneumatically operating a first positioning cylinder.

37. The method of claim 35 wherein the placing step further includes pushing the hookplate from the first position to the hookplate mounting position with a second hookplate pusher.

38. The method of claim 35 wherein the pushing step includes pneumatically operating a second positioning cylinder.

39. The method of claim 37 wherein the pushing step includes:

moving a clamp, having a fulcrum and first and second ends, away from a clamp base that holds the second end of the clamp towards the planar surface, such that the second end of the clamp shifts away from the planar surface and the first end of the clamp shifts toward the planar surface to clamp onto the hookplate; and pushing the hookplate to the hookplate mounting position.

40. A method of mounting a hookplate to a bedrail comprising the steps of:

transporting the bedrail to a hookplate receiving position;

placing the hookplate in a hookplate mounting position;

extending a pin driver into an aperture in the bedrail and an aperture in the hookplate to align the aperture in the bedrail with the aperture in the hookplate; and driving at least one pin through the bedrail and the hookplate to mount the hookplate to the bedrail.

41. The method of claim 40 wherein the extending step includes pneumatically operating a driving cylinder.

42. The method of claim 40 further comprising the step of retracting the pin driver after aligning the aperture in the bedrail with the aperture in the hookplate.

43. The method of claim 42 further comprising the step of transporting a pin from a pin supply chamber to a pin driving mechanism.

44. The method of claim 43 further comprising the step of temporarily holding the pin in a holding plate in the pin driving mechanism after the retracting step.

45. the method of claim 44 wherein the holding step includes preventing the pin from passing through the holding plate, when the pin first enters the holding plate, with a spring loaded detents.

46. The method of claim 45 further comprising the step of driving the pin past the detents and substantially completely through the aperture in the bedrail and the aperture in the hookplate to mount the hookplate to the bedrail.

47. A method of mounting a hookplate to a bedrail comprising the steps of:

transporting the bedrail to a hookplate receiving position;

placing the hookplate in a hookplate mounting position;

driving at least one pin through the bedrail and the hookplate to mount the hookplate to the bedrail; and operating a plurality of pneumatic cylinders to perform the transporting step, the placing step, and the driving step.

48. The method of claim 47 further comprising the step of detecting a position of each of the pneumatic cylinders with at least one electronic sensor.

49. The method of claim 47 further comprising the step of programming at least one programmable logic controller to control the pneumatic cylinders.

50. An apparatus for mounting a hookplate to a bedrail comprising:

transporting means for transporting a bedrail into a hookplate receiving position;

placing means for placing the hookplate in a hookplate mounting position; and driving means for driving at least one pin through the bedrail and the hookplate to mount the hookplate to the bedrail.

51. The apparatus of claim 50 further comprising pressure means for placing pressure on the bedrail when the bedrail is in the hookplate receiving position to stabilize the bedrail while the hookplate is mounted to the bedrail.

52. The apparatus of claim 51 further comprising means for pneumatically operating the pressure means.

53. The apparatus of claim 50 wherein the transporting means transports the bedrail out of the hookplate receiving position after the hookplate is mounted to the bedrail.

54. The apparatus of claim 50 wherein the placing means comprises hookplate storage means for storing a plurality of hookplates and allowing a single hookplate at a time to fall onto a planar surface.

55. The apparatus of claim 54 wherein the placing means further comprises first pushing means for pushing the hookplate that falls from the hookplate storage means to a first position.

56. The apparatus of claim 55 wherein the placing means further comprises means for pneumatically operating the first pushing means.

57. The apparatus of claim 55 wherein the placing means further comprises second hookplate pushing means for pushing the hookplate from the first position to the hookplate mounting position.

58. The apparatus of claim 57 wherein the placing means further comprises means for pneumatically operating the second pushing means.

59. The apparatus of claim 57 wherein the second hookplate pushing means comprises clamping means for clamping down onto the hookplate to push the hookplate to the hookplate mounting position.

60. The apparatus of claim 50 wherein the driving means comprises pin driving means for driving the pin through the bedrail and the hookplate.

61. The apparatus of claim 60 wherein the driving means further comprises means for pneumatically operating the pin driving means.

62. The apparatus of claim 60 wherein the pin driving means extends into an aperture in the bedrail and an aperture in the hookplate to align the aperture in the bedrail with the aperture in the hookplate.

63. The apparatus of claim 62 wherein the pin driving means retracts after aligning the with the aperture in the bedrail with the aperture in the hookplate.

64. The apparatus of claim 63 further comprising pin supply means for storing plurality of pins.

65. The apparatus of claim 64 further comprising means for transporting at least one pin from the pin supply means to the driving means after the pin driving means retracts.

66. The apparatus of claim 65 wherein the driving means comprises holding means for temporarily holding the pin after it is transported from the pin supply means to the driving means.

67. The apparatus of claim 66 wherein the pin holding means includes a stopping means for preventing the pin from passing through the holding means when the pin first enters the holding means.

68. The apparatus of claim 67 wherein pin driving means drives the pin substantially completely through the aperture in the bedrail and the aperture in the hookplate to mount the hookplate to the bedrail.

69. The apparatus of claim 50 further comprising operating means for pneumatically operating the transporting means, the placing means, and the driving means.

70. The apparatus of claim 69 further comprising detecting means for detecting the position of the operating means.

71. The apparatus of claim 69 further comprising means for controlling the operating means.

72. An apparatus for mounting a hookplate to a bedrail comprising:

transporting means for transporting a bedrail into a hookplate receiving position, the bedrail having a first end and a second end;

first placing means for placing a first hookplate in a hookplate mounting position;

second placing means for placing a second hookplate in a hookplate mounting position;

first pin driving means for driving a first pin through the first end of the bedrail and the first hookplate to mount the first hookplate to the first end of the bedrail; and second pin driving means for driving a second pin through the second end of the bedrail and the second hookplate to mount the second hookplate to the second end of the bedrail.

* * * * *